US012756554B2

United States Patent

(12) United States Patent
King et al.

(10) Patent No.: US 12,756,554 B2
(45) Date of Patent: Oct. 6, 2026

(54) SYSTEM AND METHOD FOR ESTABLISHING A QUANTUM RESISTANT TEMPORAL ENCRYPTION AND DATA AGING COMMUNICATIONS PROTOCOL

(71) Applicant: Bank of America Corporation, Charlotte, NC (US)

(72) Inventors: Adam K. King, Fort Mill, SC (US); James Siekman, Charlotte, NC (US); Sanjay Lohar, Mint Hill, NC (US); Matthew K. Bryant, Mt. Holly, NC (US); Catherine Cunningham, Charlotte, NC (US); Takiyah Watford, Fort Mill, SC (US); Elizabeth Swanzy-Parker, Charlotte, NC (US); Peter Nein, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 18/916,231

(22) Filed: Oct. 15, 2024

(65) Prior Publication Data

US 2026/0121853 A1 Apr. 30, 2026

(51) Int. Cl.

*H04L 9/08* (2006.01)
*G06F 21/60* (2013.01)
(Continued)

(52) U.S. Cl.

CPC .......... *H04L 9/0891* (2013.01); *H04L 9/0852* (2013.01); *H04L 63/0428* (2013.01);
(Continued)

(58) Field of Classification Search

CPC ... H04L 9/0891; H04L 9/0852; H04L 9/0855; H04L 63/0428; H04L 63/068; G06F 21/602; G06F 21/62
See application file for complete search history.

(56) References Cited

U.S. PATENT DOCUMENTS 7,035,411 B2 4/2006 Azuma et al.
8,693,691 B2 4/2014 Jacobs
(Continued)

FOREIGN PATENT DOCUMENTS

WO WO-2021048708 A1 * 3/2021 ............... H04L 9/14

OTHER PUBLICATIONS

Aumasson, Jean-Philippe. "The impact of quantum computing on cryptography." Computer Fraud & Security 2017.6 (2017): 8-11. ( Year: 2017).*

(Continued)

*Primary Examiner* — Robert B Leung

(57) ABSTRACT

A system includes a memory configured to store a post quantum cryptography (PQC) key and sensitive data to be transmitted to a computing device over a communication channel and a processor operably coupled to the memory and configured to access the PQC key and the sensitive data. The processor is further configured to determine, based at least in part on the sensitive data, an expiration time beyond which the sensitive data is rendered unreadable. The expiration time is identified based on an estimated future time at which a quantum computing based decryption process can be utilized to read the sensitive data. The processor is further configured to encode the sensitive data based on the PQC key. The PQC key is associated with the expiration time. The processor is further configured to transmit, over the communication channel, the encoded sensitive data to the computing device.

20 Claims, 2 Drawing Sheets

(51) Int. Cl.
*G06F 21/62* (2013.01)
*H04L 9/40* (2022.01)

(52) U.S. Cl.
CPC .......... *H04L 63/068* (2013.01); *G06F 21/602* (2013.01); *G06F 21/62* (2013.01); *H04L 9/0855* (2013.01)

(56) References Cited

U.S. PATENT DOCUMENTS

| | | | |
|---|---|---|---|
| 10,411,804 | B2 | 9/2019 | Ashrafi et al. |
| 10,476,854 | B2 | 11/2019 | Arora |
| 10,757,570 | B2 | 8/2020 | Brodsky et al. |
| 10,887,094 | B2 | 1/2021 | Ji et al. |
| 11,070,369 | B2 | 7/2021 | Howe et al. |
| 11,164,104 | B2 | 11/2021 | Ashrafi |
| 11,170,318 | B2 | 11/2021 | Ashrafi |
| 11,240,023 | B1 * | 2/2022 | Donlan ................... H04L 9/088 |
| 11,387,991 | B2 | 7/2022 | Rahman et al. |
| 11,424,918 | B2 | 8/2022 | Hay et al. |
| 11,451,383 | B2 | 9/2022 | Bush |
| 11,496,225 | B2 | 11/2022 | Rahman |
| 11,514,352 | B2 | 11/2022 | Ashrafi |
| 11,610,147 | B2 | 3/2023 | Vacon et al. |
| 11,621,836 | B2 | 4/2023 | Ashrafi |
| 11,695,551 | B2 | 7/2023 | Lukens et al. |
| 11,784,806 | B2 | 10/2023 | Figueroa et al. |
| 2006/0204003 | A1 * | 9/2006 | Takata .................. H04L 9/3268 380/30 |
| 2010/0316219 | A1 * | 12/2010 | Boubion ................ G02B 21/16 380/259 |
| 2018/0260578 | A1 * | 9/2018 | Orloff ................. G06F 21/6209 |
| 2021/0058244 | A1 | 2/2021 | Jacak et al. |
| 2022/0269976 | A1 | 8/2022 | Wang et al. |
| 2024/0378085 | A1 * | 11/2024 | Ravi ..................... G06F 9/5027 |

OTHER PUBLICATIONS

Bogomolec, X., & Gerhard, J. "Post-Quantum Secure Cryptographic Algorithms." arXiv: 1809.00371v2. Sep. 12, 2018. (Year: 2018).*

* cited by examiner

SYSTEM AND METHOD FOR ESTABLISHING A QUANTUM RESISTANT TEMPORAL ENCRYPTION AND DATA AGING COMMUNICATIONS PROTOCOL

TECHNICAL FIELD

The present disclosure relates generally to quantum computing, and, more specifically, to a system and method for establishing a quantum resistant temporal encryption and data aging communications protocol.

BACKGROUND

Existing public-key encryption algorithms, such as Rivest-Shamir-Adleman (RSA) encryption algorithms, face significant challenges in ensuring the security of communication channels against sophisticated cyberattacks and cyberthreats, such as those that may be implemented utilizing quantum computing. Specifically, existing RSA encryption algorithms rely on the assumption that factoring large prime numbers is computationally intensive for classical computing systems, and thus ensure the secure transmission and reception of sensitive data over communication channels. However, because quantum computing systems may be especially suited for "cracking" RSA encryption algorithms rather trivially (e.g., by way of Shor's algorithm), "harvest now, decrypt later" (HNDL) attacks may allow an attacker, an eavesdropper, or other adversarial user to intercept and store encrypted data until a future time at which quantum computing systems and resources are more feasible and readily available to decrypt the intercepted and harvested encrypted data.

SUMMARY

The system and methods implemented by the system as disclosed in the present disclosure provide technical solutions to the technical problems discussed above by providing systems and methods for establishing a quantum-resistant temporal encryption and data aging communications protocol. The disclosed system and methods provide several practical applications and technical advantages. Specifically, the present embodiments improve the security of transmitting and receiving encrypted sensitive data over communication channels and data storage security by generating and establishing a quantum-resistant temporal encryption and data aging communications protocol suitable for enhancing and improving the resilience of encrypted data security against both quantum computing based cyberattacks and classical computing based cyberattacks over a protracted period of time.

Specifically, the present embodiments provide a combined classical computing and quantum computing system that may be utilized to generate a post quantum cryptography (PQC) key for encrypting sensitive data to be transmitted to a computing device over a communication channel. The combined classical computing and quantum computing system may then determine, based on the sensitive data, an expiration time beyond which the sensitive data is rendered unreadable. In particular embodiments, the expiration time may be identified based on an estimated future time at which a quantum computing based decryption process can be utilized to decrypt the encoded sensitive data and access and read the sensitive data. The combined classical computing and quantum computing system may then encode the sensitive data utilizing the PQC key, which is associated with the expiration time. The combined classical computing and quantum computing system transmit, over the communication channel, the encoded sensitive data to the computing device.

In particular embodiments, the combined classical computing and quantum computing system may then monitor the PQC key and the encoded sensitive data and determine whether the expiration time has been reached. In one embodiment, in response to determining that the expiration time has been reached, the combined classical computing and quantum computing system may cause the PQC key to be destroyed. In another embodiment, in response to determining that the expiration time has been reached, the combined classical computing and quantum computing system may cause the encoded sensitive data to be destroyed.

Thus, in accordance with the presently disclosed embodiments, by associating and integrating dynamic temporal-based parameters with the one or more PQC keys, the secure temporal encryption and data aging communications protocol as described herein may enhance and improve the resilience of encrypted data security against both quantum computing based cyberattacks and classical computing based cyberattacks over a protracted period of time. Specifically, even though quantum computing systems may be especially suited for "cracking" RSA encryption algorithms rather trivially (e.g., by way of Shor's algorithm), the present embodiments obviate the threat of "harvest now, decrypt later" (HNDL) by generating and establishing a secure temporal encryption and data aging communications protocol that ensures that the sensitive data is secured even after the encoded sensitive data is harvested and stored to a memory, a database, or a server of a potential attacker, eavesdropper, or other adversarial user.

The present embodiments are directed to systems and methods for establishing a quantum-resistant temporal encryption and data aging communications protocol. In particular embodiments, a system includes a memory configured to store a post quantum cryptography (PQC) key and sensitive data to be transmitted to a computing device over a communication channel. In particular embodiments, the system may further include one or more processors operably coupled to the memory and configured to access the PQC key and the sensitive data to be transmitted to the computing device.

In particular embodiments, the one or more processors may be further configured to determine, based at least in part on the sensitive data, an expiration time beyond which the sensitive data is rendered unreadable. For example, in one embodiment, the expiration time may be identified based at least in part on an estimated future time at which a quantum computing based decryption process can be utilized to read the sensitive data. For example, in one embodiment, the one or more processors may be configured to determine the expiration time to predefine a lifecycle of the sensitive data.

In particular embodiments, the one or more processors may be further configured to encode the sensitive data based at least in part on the PQC key. In one embodiment, the PQC key may be associated with the expiration time. In particular embodiments, the one or more processors may be further configured to transmit, over the communication channel, the encoded sensitive data to the computing device. For example, in one embodiment, the computing device may be configured to receive the transmission of the encoded sensitive data and to decrypt the encoded sensitive data utilizing the PQC key based at least in part on whether the expiration time has been reached.

In particular embodiments, the one or more processors may be further configured to determine, based at least in part on the PQC key, whether the expiration time has been reached, and, in response to determining that the expiration time has been reached, cause the PQC key to be destroyed. In particular embodiments, the one or more processors may be further configured to determine, based at least in part on the PQC key, whether the expiration time has been reached, and, in response to determining that the expiration time has been reached, cause the encoded sensitive data to be destroyed.

In particular embodiments, the PQC key may include a first PQC key and the expiration time may include a first expiration time. The one or more processors may be further configured to determine, based at least in part on the encoded sensitive data, a second expiration time beyond which the encoded sensitive data is rendered unreadable, and further reencode the encoded sensitive data based at least in part on a second PQC key, wherein the second PQC key is associated with the second expiration time. In particular embodiments, the one or more processors may be further configured to iteratively execute one or more of a re-keying process, a key rotation process, a key evolution process, or a key derivation process with respect to the PQC key prior to the expiration time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

System Overview

Figure 1:
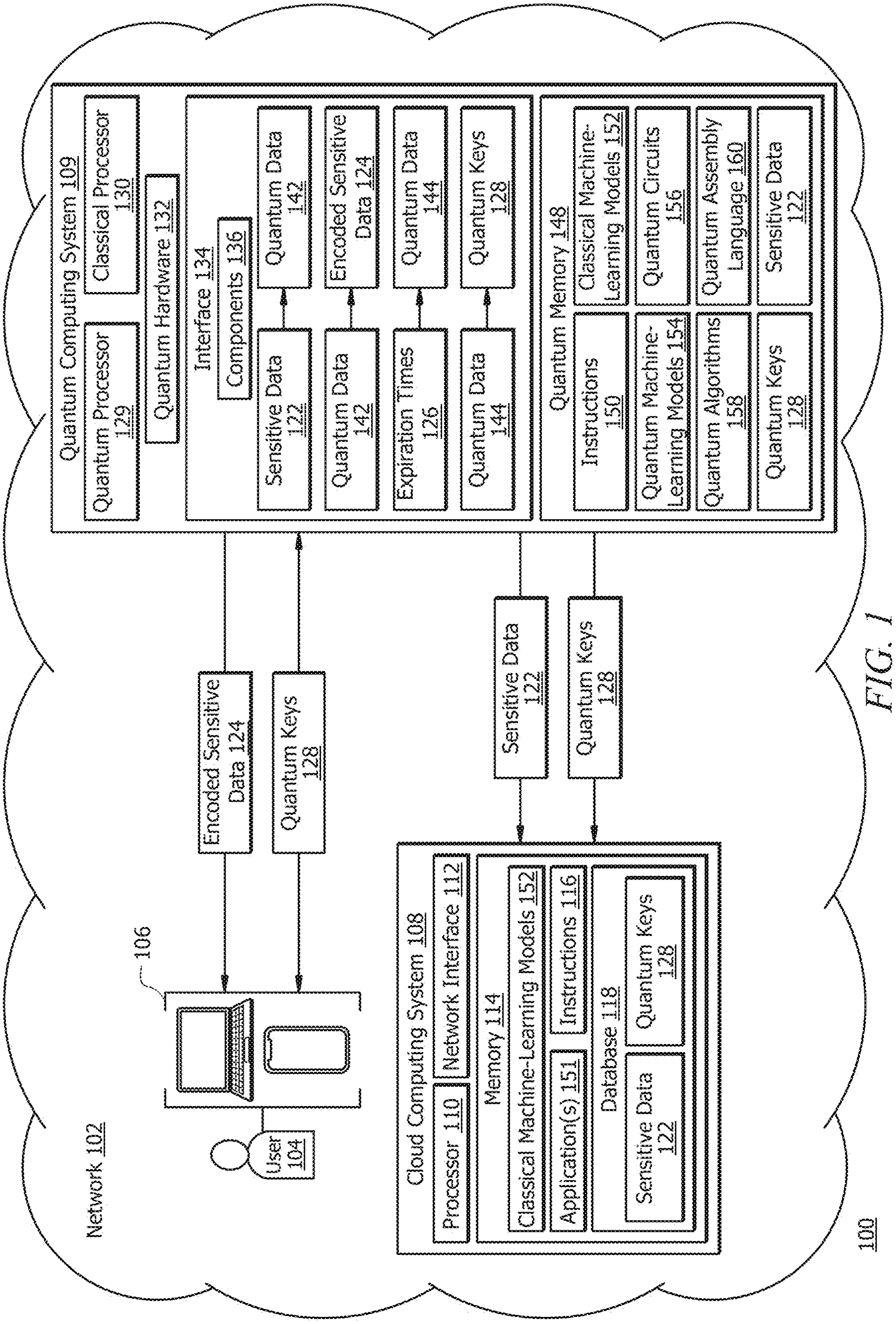
FIG. 1 is a block diagram of a combined classical computing and quantum computing system and network, in accordance with certain aspects of the present disclosure.

FIG. 1 is a block diagram of a combined classical computing and quantum computing system 100. As depicted, the combined classical computing and quantum computing system 100 may include one or more computing devices 102 that may be associated with a user 104, a cloud computing system 108, a quantum computing system 109, and a network 106 that enables the communications between the one or more computing devices 102, the cloud computing system 108, and the quantum computing system 109. In particular embodiments, the cloud computing system 108 and the quantum computing system 109 may be owned and managed by a single entity or organization, and thus, in some embodiments, the cloud computing system 108 and the quantum computing system 109 may operate in conjunction and/or may be integrated to operate as a singular computing infrastructure. In general, the combined classical computing and quantum computing system 100 may be utilized to establish a quantum-resistant temporal encryption and data aging communications protocol.

In another embodiment, one of the cloud computing system 108 and the quantum computing system 109 may be owned and managed by the single entity or organization while the other one of the cloud computing system 108 and the quantum computing system 109 may be owned and managed by a third-party entity or organization and licensed to be utilized by the single entity or organization. In one embodiment, the cloud computing system 108 may include a classical computing system suitable for executing binary or bitwise processing operations. In contrast, the quantum computing system 109 may include a quantum computing system suitable for executing superposed and entangled or quantum bit (QuBit) based parallel processing operations.

Network

Network 106 may be any suitable type of wireless and/or wired network. The network 106 may or may not be connected to the Internet or public network. The network 106 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near field communication (NFC) network, and/or any other suitable network. The network 106 may be configured to support any suitable type of communication protocol as would be appreciated by one of ordinary skill in the art.

Computing Device

Computing device 102 is generally any device that may be utilized to process data and interact with a user 104. Examples of the computing device 102 include, but are not limited to, a personal computer, a desktop computer, a workstation, a server, a laptop, a tablet computer, a mobile phone (such as a smartphone), etc. The computing device 102 may include a user interface, such as a display, a microphone, keypad, or other appropriate terminal equipment usable by the user 104. The computing device 102 may include a hardware processor, memory, and/or circuitry (not explicitly shown) configured to perform any of the functions or actions of the computing device 102 described herein. For example, a software application designed using software code may be stored in the memory and executed by the processor to perform the functions of the computing device 102. The computing device 102 may be utilized to communicate with other components of the system 100 via the network 106.

In particular embodiments, the computing device 102 may be utilized by the user 104 to communicate and exchange one or more post quantum cryptographic (PQC) keys 128 with the quantum computing system 109 and/or the cloud computing system 108. For example, in one embodiment, the computing device 102 may execute an instance of a software application 151 that may be hosted and executed by the cloud computing system 108. In particular embodiments, the user 104 may access the instance of the software application 151 executing on the computing device 102 and exchange data over the network 106 between the computing device 102 and the quantum computing system 109 and/or the cloud computing system 108. As will be discussed in greater detail below, the quantum computing system may generate the one or more PQC keys 128 and then the one or more PQC keys 128 may be shared between the computing device 102 and the quantum computing system 109 and/or the cloud computing system 108.

Cloud Computing System

The cloud computing system 108 may include any computing that may be utilized to process data and communicate with other components of the system 100 via the network 106. In one embodiment, the cloud computing system 108 may include a classical computing system suitable for executing binary or bitwise processing operations. As depicted, the cloud computing system 108 may include a processor 110 in signal communication with a memory 114 and a network interface 112.

Processor 110 may include one or more processors operably coupled to the memory 114. The processor 110 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 110 may be a programmable logic device, a microcontroller, a microprocessor, or any suitable combination of the preceding. The one or more processors 110 may be utilized to process data and may be implemented in hardware or software.

For example, the processor 110 may be 8-bit, 16-bit, 32-bit, 64-bit, or of any other suitable architecture. The one or more processors 110 may be utilized to implement various software instructions to perform the operations described herein. For example, the one or more processors 110 may be utilized to execute software instructions 116 and perform one or more functions described herein. In one embodiment, the processor 110 may be understood to be a classical processor.

Network interface 112 may be utilized to enable wired and/or wireless communications (e.g., via network 106). The network interface 112 is configured to communicate data between the cloud computing system 108 and other components of the system 100. For example, the network interface 112 may include a WIFI interface, a local area network (LAN) interface, a wide area network (WAN) interface, a modem, a switch, or a router. The processor 110 may be utilized to send and receive data using the network interface 112. The network interface 112 may be utilized to use any suitable type of communication protocol as would be appreciated by one of ordinary skill in the art.

Memory 114 may be volatile or non-volatile and may include a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. The memory 114 may store any of the information described in FIGS. 1-3 along with any other data, instructions, logic, rules, or code operable to implement the function(s) described herein. The memory 114 is operable to store software instructions 116, and/or any other data and instructions.

The software instructions 116 may include any suitable set of software instructions, logic, rules, or code operable to be executed by the processor 110. In particular embodiments, the memory 114 may further store a database 118, which may include a structured data base (e.g., structured query language (SQL) database, a non-SQL database, or other similar relational database), an unstructured database, a sorted data structure, or an unsorted data structure. In one embodiment, the memory 114 may be understood to be a classical memory. In one embodiment, the memory 114 may include a non-transitory computer-readable medium.

In particular embodiments, the database 118 may store the sensitive data 122 and the one or more PQC keys 128. For example, as will be discussed in greater detail below with respect to FIG. 2, the quantum computing system 109 may generate the one or more PQC keys 128 and utilize the one or more PQC keys 128 to encrypt the sensitive data 122 into the encoded sensitive data 124, such that the sensitive data 122 is rendered unreadable after one or more user-configurable expiration times 126 regardless of whether the encoded sensitive data 124 (e.g., an encrypted state of the sensitive data 122) is subjected to either quantum computing based cyberattacks or classical computing based cyberattacks. In particular embodiments, the quantum computing system 109 may store the sensitive data 122 and the one or more PQC keys 128 to the quantum memory 148 and the database 118.

Quantum Computing System

The quantum computing system 109 may include any quantum computing system that may be utilized to process data and communicate with other components of the system 100 via the network 106 and/or the optical communication channel 133. In one embodiment, the quantum computing system 109 may include a quantum computing system suitable for executing superposed and entangled or quantum bit (QuBit) based parallel processing operations. As depicted, the quantum computing system 109 may include a quantum processor 129, a classical processor 130, and an interface 134 in signal communication with a quantum memory 148.

The quantum processor 129 may include one or more quantum processors operably coupled to the quantum memory 148. The quantum processor 129 is configured to process quantum bits (QuBits). The quantum processor 129 may include a superconducting quantum device (with QuBits implemented by states of Josephson junctions), a trapped ion device (with qubits implemented by internal states of trapped ions), a trapped neutral atom device (with QuBits implemented by internal states of trapped neutral atoms), a photon-based device (with QuBits implemented by modes of photons), or any other suitable device that implements quantum bits with states of a respective quantum system.

In particular embodiments, the quantum processor 129 may be a quantum processing unit (QPU), which may include a number of quantum registers, a dedicated quantum memory, and a number of quantum logic gates (e.g., a quantum logic gate, a Hadamard logic gate, a Pauli-X logic gate, a Pauli-Y logic gate, a Pauli-Z logic gate, a controlled NOT logic gate, and so forth) suitable for executing superposed and entangled or quantum bit (QuBit) based parallel processing operations.

In particular embodiments, the quantum processor 129 may be further utilized to perform quantum computations, such as quantum annealing, quantum simulations, and universal quantum computing. For example, in particular embodiments, the quantum processor 129 may, in conjunction with the quantum memory 148 and utilizing the quantum hardware 132, execute one or more classical machine-learning (CML) models 152, one or more quantum machine-learning (QML) models 154, one or more quantum circuits 156, one or more quantum algorithms 158, and/or one or more quantum assembly languages 160 for performing operations on the sensitive data 122, the encoded sensitive data 124, and/or the one or more PQC keys 128.

In particular embodiments, the one or more classical machine-learning (CML) models 152 may include, for example, one or more of a spiking neural network (SNN), an autoencoder (AE), a variational autoencoder (VAE), a generative adversarial network (GAN), a convolutional neural network (CNN), a deep neural network (DNN), a deep convolutional neural network (DCNN), a graph neural network (GNN), a graph convolutional network (GCN), a bidirectional and auto-regressive transformer (BART) model, a bidirectional encoder representations for transformer (BERT) model, a generative pre-trained transformer (GPT) model, a graph transformer, or other similar machine-learning model. In another embodiment, the one or more classical machine-learning (CML) models 152 may include one or more language models (LMs) or large language model (LLMs).

Similarly, in particular embodiments, the one or more quantum machine-learning (QML) models 154 may include one or more of a quantum-enhanced machine-learning model, a quantum-inspired machine-learning model, a quantum-generalized machine-learning model, or any of various other machine-learning models in which the processing power of quantum computing and the properties of quantum physics are utilized to accelerate machine-learning tasks. Specifically, it should be appreciated that the quantum computing system 109 may be capable of executing both the one or more classical machine-learning (CML) models 152 and the one or more quantum machine-learning (QML) models 154 in accordance with the presently disclosed embodiments. On the other hand, the cloud computing system 108 may be capable of executing only the one or more classical machine-learning (CML) models 152.

In particular embodiments, the quantum hardware 132 may include, for example, a number of quantum bits (QuBits), a number of QuBit connectors, a number of QuBit interconnector circuits for control operations, and a quantum random access memory (QRAM). The one or more quantum circuits 156 may include a sequence of quantum logic gates suitable for representing and expressing each step of the one or more one or more quantum algorithms 158. For example, the one or more quantum algorithms 158 may include any of various quantum algorithms, such as quantum annealing algorithms, quantum simulation algorithms, quantum search algorithms (e.g., Grover's algorithm), quantum cryptography algorithms (e.g., Shor's algorithm), one or more quantum Fourier transform (QFT) based algorithms or inverse quantum Fourier transform (iQFT) based algorithms, one or more classical quantum hybrid algorithms (e.g., Quantum Eigensolver), one or more classical quantum variational algorithms, one or more post-quantum cryptographic algorithms (e.g., a CRYSTALS-Kyber PQC algorithm, a CRYSTALS-Dilithium PQC algorithm, a FALCON PQC algorithm, or SPHINCS+ PQC algorithm, or other similar PQC or quantum-resistant cryptographic algorithm), and/or other user-developed quantum algorithms that may be represented by instructions 150.

The classical processor 130 may include one or more processors operably coupled to the quantum memory 148. The classical processor 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The classical processor 130 may be a programmable logic device, a microcontroller, a microprocessor, or any suitable combination of the preceding. The one or more processors are configured to process data and may be implemented in hardware or software. For example, the classical processor 130 may be 8-bit, 16-bit, 32-bit, 64-bit, or of any other suitable architecture. The one or more processors are configured to implement various software instructions to perform the operations described herein.

The interface 134 may be utilized to convert data items represented by classical binary bits of data into to quantum bits (QuBits) of data. For example, in some embodiments, the interface 134 may convert sensitive data 122 data represented as classical binary bits of data into quantum data 142 for further processing, and, similarly, convert the expiration times 126 represented as classical binary bits of data into quantum data 144 for further processing, for example.

In particular embodiments, the interface 134 may be further utilized to convert data items represented by quantum bits (QuBits) of data into classical binary bits of data. For example, in particular embodiments, upon the quantum computing system 109 encrypting the sensitive data 122 based on the quantum data 142, the interface 134 may convert the quantum data 142 representing the sensitive data 122 into classical binary bits of data representing the encoded sensitive data 124. Likewise, upon the quantum computing system 109 generating the expiration times 126 based on the quantum data 144, the interface 134 may convert the quantum data 144 representing the one or more PQC keys 128 into classical binary bits of data representing the one or more PQC keys 128.

For example, in accordance with presently disclosed embodiments, the quantum computing system 109 may be utilized to generate the one or more PQC keys 128 for encrypting the sensitive data 122 to be transmitted to a computing device 102. The quantum computing system 109 may then determine, based on the sensitive data 122, one or more expiration times 126 beyond which the sensitive data 122 is rendered unreadable. In particular embodiments, the one or more expiration times 126 may be identified based on an estimated future time at which a quantum computing based decryption process can be utilized to decrypt the encoded sensitive data 124 and access and read the sensitive data 122. The quantum computing system 109 may then encode the sensitive data 122 utilizing the one or more PQC keys 128, which may be associated with the one or more expiration times 126 and shared with the computing device 102. The quantum computing system 109 may then transmit, over the network 106, the encoded sensitive data 124 (e.g., encrypted state of the sensitive data 122) to the computing device 102.

Further, in accordance with presently disclosed embodiments, the quantum computing system 109 may then monitor the one or more PQC keys 128 and the encoded sensitive data 124 and determine whether the one or more expiration times 126 have passed. In one embodiment, in response to determining that the one or more expiration times 126 have been passed, the quantum computing system 109 may then cause the one or more PQC keys 128 to be destroyed. In another embodiment, in response to determining that the one or more expiration times 126 have passed, the quantum computing system 109 may then cause the encoded sensitive data 124 to be destroyed.

In particular embodiments, the interface 134 may include a number of components 136 that may be utilized to generate and manipulate quantum bits (QuBits). In the illustrated embodiment, the number of components 136 and the quantum processor 129 are configured to operate on a same type of quantum bits (QuBits). For example, when the quantum processor 129 includes a photon-based device (with QuBits implemented by modes of photons), the number of components 136 may include optical components such as lasers, mirrors, prisms, waveguides, interferometers, optical fibers, filters, polarizers, and/or lenses. In particular embodiments, the number of components 136 may further include one or more quantum-based light sources, such as one or more semiconductor quantum dots (QDs), a high-intensity laser, a quantum particle generator, or other similar quantum-based light source.

Quantum memory 148 may include a quantum read-only memory (QROM), quantum random-access memory (QRAM), or other similar quantum memory. The quantum memory 148 may store any of the information described in FIGS. 1 and 2 along with any other data, instructions, logic, rules, or code operable to implement the function(s) described herein. The quantum memory 148 is operable to store software instructions 150, and/or any other data and instructions. The software instructions 150 may include any suitable set of software instructions, logic, rules, or code operable to be executed by the quantum processor 129. In one embodiment, the quantum memory 148 may include a non-transitory computer-readable medium.

In another embodiment, the quantum memory 148 may include a quantum storage medium, which may be utilized to store the one or more pairs of entangled QuBits once generated by the one or more quantum light sources (e.g., semiconductor QDs, high-intensity laser, quantum particle generator). For example, in one embodiment, the quantum memory 148 may include, for example, a cryogenic storage medium, a nitrogen-vacancy (N-V) center in diamond storage medium, one or more rare-earth-ion-doped crystals, one or more quantum dots (QDs), a quantum optical memory (QOM), one or more superconducting QuBits, a controlled reversible inhomogeneous broadening of a single atomic absorption line (CRIB) storage medium, or other similar quantum storage medium.

Establishing a Quantum-Resistant Temporal Encryption and Data Aging Communications Protocol Embodiments of the present disclosure discuss techniques for establishing a quantum-resistant temporal encryption and data aging communications protocol.

Figure 2:
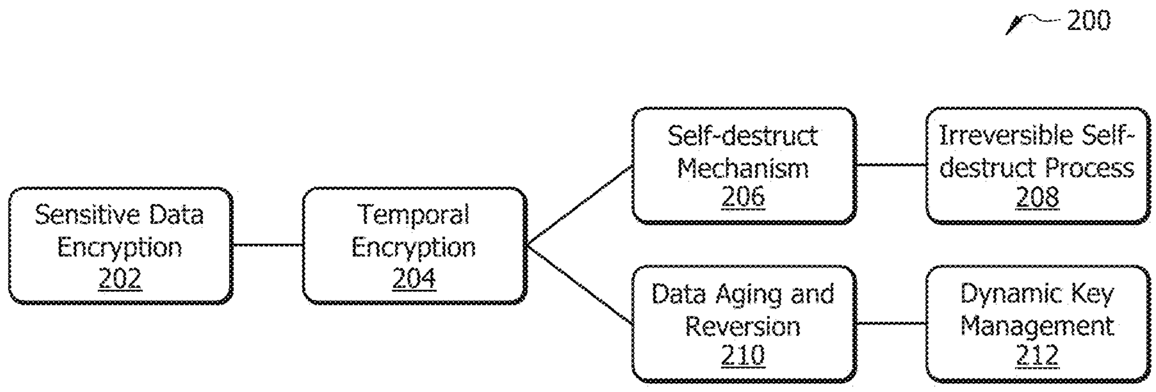
FIG. 2 illustrates a diagram of a quantum-resistant temporal encryption and data aging communications protocol architecture, in accordance with one or more embodiments of the present disclosure.

FIG. 2 illustrates a diagram of a workflow of a temporal encryption and data aging communications protocol architecture 200 that may be utilized to establish a quantum-resistant temporal encryption and data aging communications protocol, in accordance with certain aspects of the present disclosure. In particular embodiments, the workflow of the temporal encryption and data aging communications protocol architecture 200 may be executed, for example, by the combined classical computing and quantum computing system 100 as described above with respect to FIG. 1. For example, in one embodiment, the method 300 may be performed by the cloud computing system 108 alone. In another embodiment, the method 300 may be performed by the quantum computing system 109 alone. In yet another embodiment, the method 300 may be performed in conjunction by the cloud computing system 108 and the quantum computing system 109.

In particular embodiments, the workflow of the temporal encryption and data aging communications protocol architecture 200 may begin with the cloud computing system 108 and/or the quantum computing system 109 performing a sensitive data encryption process 202. For example, in particular embodiments, the cloud computing system 108 and/or the quantum computing system 109 may access one or more post quantum cryptography (PQC) keys 128 and sensitive data 122 to be transmitted to the computing device 102 over the network 106 and/or an optical communications channel that may be established between the quantum computing system 109 and the computing device 102, for example.

In one embodiment, the one or more PQC keys 128 may be generated in accordance with, for example, one or more of a CRYSTALS-Kyber PQC algorithm, a CRYSTALS-Dilithium PQC algorithm, a FALCON PQC algorithm, or SPHINCS+PQC algorithm, or other similar PQC or quantum-resistant cryptographic algorithm. In another embodiment, the one or more PQC keys 128 may include one or more pre-shared keys (PSKs) that may be shared between the cloud computing system 108 and/or the quantum computing system 109 and the computing device 102 prior to establishing communications link between the cloud computing system 108 and/or the quantum computing system 109 and the computing device 102.

In particular embodiments, the cloud computing system 108 and/or the quantum computing system 109 may then perform the sensitive data encryption process 202 by encoding the sensitive data 122 utilizing the one or more PQC keys 128. In particular embodiments, the workflow of the temporal encryption and data aging communications protocol architecture 200 may then continue with the cloud computing system 108 and/or the quantum computing system 109 performing a temporal encryption process 204. For example, in one embodiment, the one or more PQC keys 128 may be associated with an expiration time, which may include a time beyond which the sensitive data 122 is rendered unreadable (e.g., regardless of whether the sensitive data 122 is stored or transmitted).

In particular embodiments, the cloud computing system 108 and/or the quantum computing system 109 may identify the expiration time may be identified based on an estimated future time at which a potential attacker, an eavesdropper, or other adversarial user may be equipped with a quantum computing system and implement, for example, Shor's algorithm or other similar quantum computing based algorithm to decrypt the encoded sensitive data 124 and access and read the sensitive data 122. Thus, in one embodiment, the expiration time may predefine a lifecycle (e.g., a lifespan) for the sensitive data 122, such that the sensitive data 122 is rendered unreadable after the expiration time regardless of whether the sensitive data 122 is access or stored by an authorized user or unauthorized user (e.g., an attacker, an eavesdropper, or other adversarial user).

In one embodiment, the expiration time may be user-configurable and may be estimated by the cloud computing system 108 and/or the quantum computing system 109 in terms of years (e.g., 1 year, 2 years, 3 years, 4 years, 5 years, . . . . N years), months (e.g., 1 month, 2 months, 3 months, 4 months, 5 months, . . . . N months), or days (e.g., 30 days, 60 days, 90 days, 120 days, . . . . N days), and so forth. In particular embodiments, the workflow of the temporal encryption and data aging communications protocol architecture 200 may continue with the cloud computing system 108 and/or the quantum computing system 109 performing a self-destruction mechanism and process 206. For example, in particular embodiments, the cloud computing system 108 and/or the quantum computing system 109 may determine, based on the one or more PQC keys 128 utilized to encrypt the sensitive data 122, whether the expiration time has been reached.

In one embodiment, in response to determining that the expiration time has been reached, the workflow of the temporal encryption and data aging communications protocol architecture 200 may continue with the cloud computing system 108 and/or the quantum computing system 109 executing an irreversible self-destruction process 208 to destroy the one or more PQC keys 128 previously utilized to encrypt the sensitive data 122. For example, in particular embodiments, the cloud computing system 108 and/or the quantum computing system 109 may execute the irreversible self-destruction process 208 by temporarily escrowing or storing the one or more PQC keys 128 and/or any information suitable for reconstructing the one or more PQC keys 128 on the quantum memory 148 as one or more QuBits of data, within the database 118 as one or more classical bits of data, or with one or more trusted third-party entities in a manner such that once the one or more PQC keys 128 and/or information suitable for reconstructing the one or more PQC keys 128 is destroyed (e.g., rendered unreadable, indecipherable, or unrecoverable) the sensitive data 122 is also rendered permanently unreadable.

In another embodiment, in response to determining that the expiration time has been reached, the cloud computing system 108 and/or the quantum computing system 109 may then execute the irreversible self-destruction process 208 to destroy the sensitive data 122 itself. For example, in particular embodiments, the cloud computing system 108 and/or the quantum computing system 109 may execute the irreversible self-destruction process 208 by temporarily escrowing or storing the one or more PQC keys 128 and/or any information suitable for reconstructing the one or more PQC keys 128 on the quantum memory 148 as one or more QuBits of data or within the database 118 as one or more classical bits of data, and then executing one or more data erasure or data degradation mechanisms that may be suitable for destroying (e.g., rendering inoperable) the quantum memory 148 itself and/or the database 118 itself.

In particular embodiments, the workflow of the temporal encryption and data aging communications protocol architecture 200 may also include the cloud computing system 108 and/or the quantum computing system 109 performing a data ageing and reversion process 210. For example, in particular embodiments, the cloud computing system 108 and/or the quantum computing system 109 may associate with the one or more PQC keys 128 utilized to encrypt or re-encrypt the sensitive data 122 a data ageing and reversion mechanism suitable for allowing the "natural" aging (e.g., age or progress with time) of encoded sensitive data 124 over time.

For example, as part of the data ageing and reversion process 210, a complexity of the encryption of the encoded sensitive data 124 or a level of sensitivity of the encoded sensitive data 124 may gradually reduce over time (e.g., over a user-configurable number of years, months, or days) until the encoded sensitive data 124 ultimately reverts to the unencrypted sensitive data 122. Specifically, the data ageing and reversion process 210 may ensure that as the encoded sensitive data 124 becomes progressively less sensitive over time, the encoded sensitive data 124 ultimately returns to sensitive data 122 (e.g., an unencrypted state of the encoded sensitive data 124).

In particular embodiments, the workflow of the temporal encryption and data aging communications protocol architecture 200 may also include the cloud computing system 108 and/or the quantum computing system 109 performing a dynamic key-management process 212. For example, in particular embodiments, the cloud computing system 108 and/or the quantum computing system 109 may iteratively execute one or more of a re-keying process, a key rotation process, a key evolution process, or a key derivation process with respect to the PQC key prior to the expiration time. Specifically, in addition to generating the one or more PQC keys 128 and encrypting the sensitive data 122 based thereon, the cloud computing system 108 and/or the quantum computing system 109 may further increase the security of the encoded sensitive data 124 thorough iteratively managing the one or more PQC keys 128 by way of, for example, re-keying, key rotation, key evolution, key derivation, and so forth.

Thus, in accordance with the presently disclosed embodiments, by associating and integrating dynamic temporal-based parameters with the one or more PQC keys 128, the quantum-resistant temporal encryption and data aging communications protocol as described herein may enhance and improve the resilience of data security against both quantum computing based cyberattacks and classical computing based cyberattacks over a protracted period of time. Specifically, even though quantum computing systems may be especially suited for "cracking" RSA encryption algorithms rather trivially (e.g., by way of Shor's algorithm), the present embodiments obviate the threat of "harvest now, decrypt later" (HNDL) by generating and establishing a quantum-resistant temporal encryption and data aging communications protocol that ensures that the sensitive data 122 is secured even after the encoded sensitive data 124 is harvested and stored to a memory, a database, or a server of a potential attacker, eavesdropper, or other adversarial user.

Figure 3:
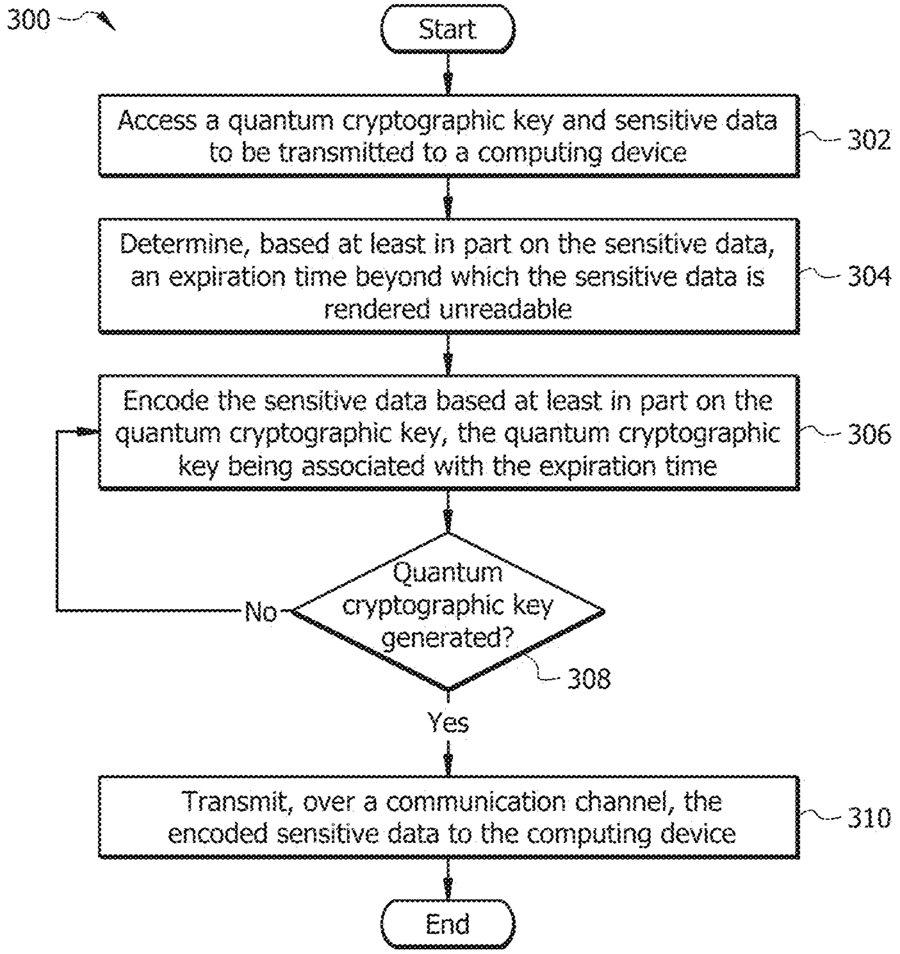
FIG. 3 illustrates a flowchart of an example method for establishing a quantum-resistant temporal encryption and data aging communications protocol, in accordance with one or more embodiments of the present disclosure.

FIG. 3 illustrates a flowchart of an example method 300 for establishing a quantum-resistant temporal encryption and data aging communications protocol, in accordance with one or more embodiments of the present disclosure. The method 300 may be performed by the combined classical computing and quantum computing system 100 as described above with respect to FIG. 1. For example, in one embodiment, the method 300 may be performed by the cloud computing system 108 alone. In another embodiment, the method 300 may be performed by the quantum computing system 109 alone. In yet another embodiment, the method 300 may be performed in conjunction by the cloud computing system 108 and the quantum computing system 109.

The method 300 may begin at block 302 with the cloud computing system 108 and/or the quantum computing system 109 accessing a quantum cryptographic key (e.g., one or more PQC keys 128) and sensitive data 122 to be transmitted to a computing device 102. In particular embodiments, the method 300 may continue at block 304 with the cloud computing system 108 and/or the quantum computing system 109 determining, based at least in part on the sensitive data 122, an expiration time (e.g., one or more expiration times 126) beyond which the sensitive data 122 is rendered unreadable.

For example, in particular embodiments, the cloud computing system 108 and/or the quantum computing system 109 may identify the one or more expiration times 126 based on an estimated future time at which a potential attacker, an eavesdropper, or other adversarial user may be equipped with a quantum computing system and implement, for example, Shor's algorithm or other similar quantum computing based algorithm to decrypt the encoded sensitive data 124 and access and read the sensitive data 122. Thus, in accordance with the presently disclosed embodiments, the expiration time may predefine a lifecycle (e.g., a lifespan) for the sensitive data 122, such that the sensitive data 122 is rendered unreadable after the expiration time regardless of whether the sensitive data 122 is access or stored by an authorized user or unauthorized user (e.g., an attacker, an eavesdropper, or other adversarial user).

In particular embodiments, the method 300 may continue at block 306 with the cloud computing system 108 and/or the quantum computing system 109 encoding the sensitive data 122 based at least in part on the quantum cryptographic key (e.g., one or more PQC keys 128), in which the quantum cryptographic key (e.g., one or more PQC keys 128) may be associated with the expiration time (e.g., one or more expiration times 126). For example, in one embodiment, the cloud computing system 108 and/or the quantum computing system 109 may generate the one or more PQC keys 128 in accordance with, for example, one or more of a CRYSTALS-Kyber PQC algorithm, a CRYSTALS-Dilithium PQC algorithm, a FALCON PQC algorithm, or SPHINCS+PQC algorithm, or other similar PQC or quantum-resistant cryptographic algorithm. In another embodiment, the one or more PQC keys 128 may include one or more pre-shared keys (PSKs).

In particular embodiments, the method 300 may continue at decision 308 with the cloud computing system 108 and/or the quantum computing system 109 confirming whether the quantum cryptographic key (e.g., one or more PQC keys 128) has been generated. In particular embodiments, in response to confirming that the quantum cryptographic key (e.g., one or more PQC keys 128) has not been generated (e.g., at decision 308), the method 300 may return to block 306.

On the other hand, in response to confirming that the quantum cryptographic key (e.g., one or more PQC keys 128) has been generated (e.g., at decision 308), the method 300 may conclude at block 310 with the cloud computing system 108 and/or the quantum computing system 109 transmitting, over a communication channel, the encoded sensitive data 124 to the computing device 102. For example, in one embodiment, the computing device 102 may receive the transmission of the encoded sensitive data 124 and the one or more PQC keys 128 and utilize the one or more PQC keys 128 to decrypt the encoded sensitive data 124 utilizing the PQC key based on whether the expiration time has been reached.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:

a memory configured to store a post quantum cryptography (PQC) key and sensitive data to be transmitted to a computing device over a communication channel; and one or more processors operably coupled to the memory and configured to:

access the PQC key and the sensitive data to be transmitted to the computing device;

determine, based at least in part on the sensitive data, an expiration time beyond which the sensitive data is rendered unreadable, wherein the expiration time is identified based at least in part on an estimated future time at which a quantum computing based decryption process can be utilized to read the sensitive data;

encode the sensitive data based at least in part on the PQC key, wherein the PQC key is associated with the expiration time; and transmit, over the communication channel, the encoded sensitive data to the computing device.

2. The system of claim 1, wherein the one or more processors are further configured to:

determine, based at least in part on the PQC key, whether the expiration time has been reached; and in response to determining that the expiration time has been reached, cause the PQC key to be destroyed.

3. The system of claim 1, wherein the one or more processors are further configured to:

determine, based at least in part on the PQC key, whether the expiration time has been reached; and in response to determining that the expiration time has been reached, cause the encoded sensitive data to be destroyed.

4. The system of claim 1, wherein the PQC key comprises a first PQC key and the expiration time comprises a first expiration time, and wherein the one or more processors are further configured to:

determine, based at least in part on the encoded sensitive data, a second expiration time beyond which the encoded sensitive data is rendered unreadable; and re-encode the encoded sensitive data based at least in part on a second PQC key, wherein the second PQC key is associated with the second expiration time.

5. The system of claim 1, wherein the one or more processors are further configured to iteratively execute one or more of a re-keying process, a key rotation process, a key evolution process, or a key derivation process with respect to the PQC key prior to the expiration time.

6. The system of claim 1, wherein the one or more processors are further configured to determine the expiration time to predefine a lifecycle of the sensitive data.

7. The system of claim 1, wherein the computing device is configured to receive the transmission of the encoded sensitive data and to decrypt the encoded sensitive data utilizing the PQC key based at least in part on whether the expiration time has been reached.

8. A method, comprising:

accessing a post quantum cryptography (PQC) key and sensitive data to be transmitted to a computing device over a communication channel;

determining, based at least in part on the sensitive data, an expiration time beyond which the sensitive data is rendered unreadable, wherein the expiration time is identified based at least in part on an estimated future time at which a quantum computing based decryption process can be utilized to read the sensitive data;

encoding the sensitive data based at least in part on the PQC key, wherein the PQC key is associated with the expiration time; and transmitting, over the communication channel, the encoded sensitive data to the computing device.

9. The method of claim 8, further comprising:

determining, based at least in part on the PQC key, whether the expiration time has been reached; and in response to determining that the expiration time has been reached, causing the PQC key to be destroyed.

10. The method of claim 8, further comprising:

determining, based at least in part on the PQC key, whether the expiration time has been reached; and in response to determining that the expiration time has been reached, causing the encoded sensitive data to be destroyed.

11. The method of claim 8, wherein the PQC key comprises a first PQC key and the expiration time comprises a first expiration time, the method further comprising:

determining, based at least in part on the encoded sensitive data, a second expiration time beyond which the encoded sensitive data is rendered unreadable; and re-encoding the encoded sensitive data based at least in part on a second PQC key, wherein the second PQC key is associated with the second expiration time.

12. The method of claim 8, further comprising iteratively executing one or more of a re-keying process, a key rotation process, a key evolution process, or a key derivation process with respect to the PQC key prior to the expiration time.

13. The method of claim 8, wherein determining the expiration time comprises predefining a lifecycle of the sensitive data.

14. The method of claim 8, wherein the computing device is configured to receive the transmission of the encoded sensitive data and to decrypt the encoded sensitive data utilizing the PQC key based at least in part on whether the expiration time has been reached.

15. A non-transitory computer-readable medium storing instructions that, when executed by one or more quantum processors, cause the one or more processors to:

access a post quantum cryptography (PQC) key and sensitive data to be transmitted to a computing device over a communication channel;

determine, based at least in part on the sensitive data, an expiration time beyond which the sensitive data is rendered unreadable, wherein the expiration time is identified based at least in part on an estimated future time at which a quantum computing based decryption process can be utilized to read the sensitive data;

encode the sensitive data based at least in part on the PQC key, wherein the PQC key is associated with the expiration time; and transmit, over the communication channel, the encoded sensitive data to the computing device.

16. The non-transitory computer-readable medium of claim 15, wherein the instructions further cause the one or more processors to:

determine, based at least in part on the PQC key, whether the expiration time has been reached; and in response to determining that the expiration time has been reached, cause the PQC key to be destroyed.

17. The non-transitory computer-readable medium of claim 15, wherein the instructions further cause the one or more processors to:

determine, based at least in part on the PQC key, whether the expiration time has been reached; and in response to determining that the expiration time has been reached, cause the encoded sensitive data to be destroyed.

18. The non-transitory computer-readable medium of claim 15, wherein the PQC key comprises a first PQC key and the expiration time comprises a first expiration time, and wherein the instructions further cause the one or more processors to:

determine, based at least in part on the encoded sensitive data, a second expiration time beyond which the encoded sensitive data is rendered unreadable; and re-encode the encoded sensitive data based at least in part on a second PQC key, wherein the second PQC key is associated with the second expiration time.

19. The non-transitory computer-readable medium of claim 15, wherein the instructions further cause the one or more processors to iteratively execute one or more of a re-keying process, a key rotation process, a key evolution process, or a key derivation process with respect to the PQC key prior to the expiration time.

20. The non-transitory computer-readable medium of claim 15, wherein the instructions further cause the one or more processors to determine the expiration time to predefine a lifecycle of the sensitive data.

* * * * *